United States Patent
Melinger et al.

(10) Patent No.: US 10,933,322 B2
(45) Date of Patent: Mar. 2, 2021

(54) METHOD AND SYSTEM FOR ENCOURAGING A PERSON TO AFFIRMATIVELY ENGAGE IN AN ACTIVITY

(71) Applicant: FanDuel Limited, Edinburgh (GB)

(72) Inventors: Daniel Jonathan Melinger, New York, NY (US); Eric John Entin, Astoria, NY (US); Scott Parker Shay, Brooklyn, NY (US); Thomas Gordon Griffiths, Brooklyn, NY (US)

(73) Assignee: FanDuel Limited, Edinburgh (GB)

( * ) Notice: Subject to any disclaimer, the term of this patent is extended or adjusted under 35 U.S.C. 154(b) by 100 days.

(21) Appl. No.: 14/755,619

(22) Filed: Jun. 30, 2015

(65) Prior Publication Data
US 2017/0001115 A1    Jan. 5, 2017

(51) Int. Cl.
| | |
|---|---|
| A63F 13/44 | (2014.01) |
| H04N 21/475 | (2011.01) |
| H04N 21/478 | (2011.01) |
| H04N 21/4784 | (2011.01) |
| H04N 21/414 | (2011.01) |
| H04N 21/258 | (2011.01) |
| A63F 13/40 | (2014.01) |
| A63F 13/828 | (2014.01) |

(52) U.S. Cl.
CPC ............. *A63F 13/44* (2014.09); *A63F 13/40* (2014.09); *A63F 13/828* (2014.09); *H04N 21/25866* (2013.01); *H04N 21/41415* (2013.01); *H04N 21/475* (2013.01); *H04N 21/4781* (2013.01); *H04N 21/4784* (2013.01); *A63F 2300/638* (2013.01)

(58) Field of Classification Search
CPC ............... H04N 7/18; H04N 21/25866; H04N 21/41415; H04N 21/475; H04N 21/4781; H04N 21/4784; A63F 9/24; A63F 13/44; A63F 13/40; A63F 13/828; A63F 2300/638; G06Q 30/0211
See application file for complete search history.

(56) References Cited

U.S. PATENT DOCUMENTS

| | | | | |
|---|---|---|---|---|
| 6,231,445 B1 * | 5/2001 | Acres | ...................... | G07F 17/32 |
| | | | | 463/16 |
| 8,025,572 B2 * | 9/2011 | Spanton | .................. | A63F 13/86 |
| | | | | 463/42 |
| 8,176,518 B1 * | 5/2012 | Junkin | .................... | A63F 13/63 |
| | | | | 725/61 |

(Continued)

OTHER PUBLICATIONS

International Search Report dated Sep. 19, 2016 from International Application No. PCT/IB2016/000866, 6 pages.

(Continued)

*Primary Examiner* — Malina D. Blaise
(74) *Attorney, Agent, or Firm* — Erise IP, P.A.

(57) ABSTRACT

There is provided a method that includes (a) receiving an activation signal from a user interface, (b) receiving data indicative of an occurrence of an event, (c) allotting a benefit, in response to the occurrence of the event, (d) recognizing that the event occurred within a window of time with respect to a time of occurrence of the activation signal, and (e) modifying the benefit to yield a modified benefit. There is also provided a system that performs the method.

8 Claims, 9 Drawing Sheets

Example 600

(56) References Cited

U.S. PATENT DOCUMENTS

| | | | | |
|---|---|---|---|---|
| 10,293,260 B1* | 5/2019 | Evans | | A63F 13/67 |
| 2003/0157976 A1* | 8/2003 | Simon | | G06Q 50/34 |
| | | | | 463/1 |
| 2003/0220143 A1* | 11/2003 | Shteyn | | A63F 13/792 |
| | | | | 463/42 |
| 2004/0235564 A1* | 11/2004 | Booth | | A63F 13/12 |
| | | | | 463/31 |
| 2005/0143166 A1* | 6/2005 | Walker | | G07F 17/3244 |
| | | | | 463/25 |
| 2006/0004495 A1* | 1/2006 | Baur | | A63G 25/00 |
| | | | | 701/1 |
| 2006/0229124 A1* | 10/2006 | Walker | | G07F 17/32 |
| | | | | 463/20 |
| 2007/0233585 A1* | 10/2007 | Ben Simon | | G06Q 40/00 |
| | | | | 705/35 |
| 2007/0260567 A1* | 11/2007 | Funge | | G06N 20/00 |
| | | | | 706/47 |
| 2007/0293293 A1* | 12/2007 | Baerlocher | | G07F 17/32 |
| | | | | 463/16 |
| 2008/0248865 A1* | 10/2008 | Tedesco | | G07F 17/3248 |
| | | | | 463/25 |
| 2009/0191930 A1* | 7/2009 | Lutnick | | A63F 1/04 |
| | | | | 463/6 |
| 2009/0247259 A1* | 10/2009 | Napolitano | | G07F 17/3244 |
| | | | | 463/18 |
| 2010/0009742 A1* | 1/2010 | Popovich | | G07F 17/32 |
| | | | | 463/25 |
| 2010/0120494 A1* | 5/2010 | DeWaal | | G07F 17/3274 |
| | | | | 463/20 |
| 2010/0227667 A1* | 9/2010 | Englman | | G07F 17/3244 |
| | | | | 463/20 |
| 2010/0279754 A1* | 11/2010 | Tanenbaum | | G07F 17/3288 |
| | | | | 463/3 |
| 2011/0009187 A1* | 1/2011 | Mastropietro | | G07F 17/32 |
| | | | | 463/25 |
| 2011/0281620 A1* | 11/2011 | Hays | | G07F 17/3288 |
| | | | | 463/2 |
| 2012/0046095 A1* | 2/2012 | Shore | | G07F 17/3244 |
| | | | | 463/25 |
| 2012/0258790 A1* | 10/2012 | Gomez | | G07F 17/3276 |
| | | | | 463/25 |
| 2012/0316659 A1* | 12/2012 | Magas | | A63F 13/828 |
| | | | | 700/91 |
| 2012/0322545 A1* | 12/2012 | Arnone | | G07F 17/3272 |
| | | | | 463/25 |
| 2013/0072305 A1* | 3/2013 | Saks | | A63F 13/46 |
| | | | | 463/42 |
| 2013/0222597 A1* | 8/2013 | Brink | | G06Q 30/0211 |
| | | | | 348/157 |
| 2014/0045595 A1* | 2/2014 | Baschnagel, III | | A63F 13/10 |
| | | | | 463/40 |
| 2014/0087848 A1* | 3/2014 | Kosta | | G07F 17/3218 |
| | | | | 463/25 |
| 2014/0364201 A1* | 12/2014 | Tanibuchi | | A63F 13/58 |
| | | | | 463/25 |
| 2015/0024852 A1* | 1/2015 | Pacey | | A63F 13/67 |
| | | | | 463/43 |
| 2015/0038232 A1* | 2/2015 | Mikus | | A63F 13/12 |
| | | | | 463/42 |
| 2015/0080130 A1* | 3/2015 | Tanibuchi | | A63F 13/65 |
| | | | | 463/31 |
| 2015/0254932 A1* | 9/2015 | Boese | | G07F 17/3258 |
| | | | | 463/10 |
| 2016/0196765 A1* | 7/2016 | Stauch | | G09B 19/00 |
| | | | | 434/236 |
| 2016/0328926 A1* | 11/2016 | Boese | | G07F 17/34 |
| 2017/0001111 A1* | 1/2017 | Willette | | A63F 13/49 |
| 2017/0165577 A1* | 6/2017 | Carr | | A63F 13/35 |
| 2017/0249801 A1* | 8/2017 | Malek | | G07F 17/3211 |
| 2018/0071638 A1* | 3/2018 | Wagschal | | A63F 13/828 |

OTHER PUBLICATIONS

Written Opinion dated Sep. 19, 2016 from International Application No. PCT/IB2016/000866, 7 pages.

International Preliminary Report on Patentability for the corresponding international application: PCT/IB2016/000866, 9 pages, dated Jan. 11, 2018.

European Office Action for the corresponding European application: 16736611.1, 8 pages, dated Apr. 22, 2020.

* cited by examiner

US 10,933,322 B2

METHOD AND SYSTEM FOR ENCOURAGING A PERSON TO AFFIRMATIVELY ENGAGE IN AN ACTIVITY

BACKGROUND OF THE DISCLOSURE

1. Field of the Disclosure

The present disclosure relates to an engagement of a person in an activity, and more particularly, to encouraging the person to direct his attention to an occurrence of an event, such as in a game or competition.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

There are situations where it is desirable for a person to be affirmatively engaged in an activity, and more specifically, for the person to direct his attention to an occurrence of an event, such as in a game. For example, a spectator watching a game may experience a greater level of excitement and affinity for a player in the game if the spectator has some way of being physically or intellectually engaged with the game.

A fantasy sport is a game where participants act as managers to define a team that competes against teams defined by other managers based on statistics generated by real individual players, groups of players or teams of a sport or competition. A common variant converts statistical performance into points that are compiled and totaled according to a roster selected by a participant who defines a fantasy team. More complex variants use computer modeling of actual games based on statistical input generated by professional sports.

A fantasy sport experience is often facilitated by a computer that is operated by a service provider. An elevated level of engagement on the part of a participant can provide increased enjoyment by the participant, increase loyalty of the participant, improve the reputation of the service provider, and encourage other participants to use the service provider.

SUMMARY OF THE DISCLOSURE

The present document discloses a method and a system for encouraging a person to affirmatively engage in an activity, and more specifically, encouraging the person to direct his attention to an occurrence of an event, such as in a game. The person operates a user device that includes a feature that is referred to herein as a "turbo". If the person activates the turbo in close temporal proximity to the occurrence of the event, the system provides some form of benefit either to the person or to another person.

Accordingly, the method includes (a) receiving an activation signal from a user interface, (b) receiving data indicative of an occurrence of an event, (c) allotting a benefit, in response to the occurrence of the event, (d) recognizing that the event occurred within a window of time with respect to a time of occurrence of the activation signal, and (e) modifying the benefit to yield a modified benefit. The system performs the method.

BRIEF DESCRIPTION OF THE DRAWINGS

A component or a feature that is common to more than one drawing is indicated with the same reference number in each of the drawings.

DESCRIPTION OF THE DISCLOSURE

The present document discloses a method and a system for encouraging a person to affirmatively engage in an activity, and more specifically, encouraging the person to direct his attention to an occurrence of an event, such as in a game. The person operates a user device that includes a feature that is referred to herein as a "turbo". If the person activates the turbo in close temporal proximity to the occurrence of the event, the system provides some form of benefit either to the person or to another person. The person is thus engaged with the activity in real-time.

By way of example, assume that the system provides a fantasy sport experience, and that John has defined a fantasy basketball team that includes Player X. As such, if Player X is participating in a basketball game and scores a basket, the system will allot a point to John. Assume also that John is a spectator watching the basketball game, and that John has a user device that includes the turbo feature. When John activates the turbo feature, the system opens a turbo window for some period of time, e.g. 3 seconds. If Player X scores a basket during the turbo window, then the point that John would ordinarily receive is multiplied, e.g., times 3, and so, John will receive 3 points rather than 1 point. Thus, by granting a higher number of points when John activates the turbo in close temporal proximity to the occurrence of the basket, the system encourages John to watch the game.

Figure 1:
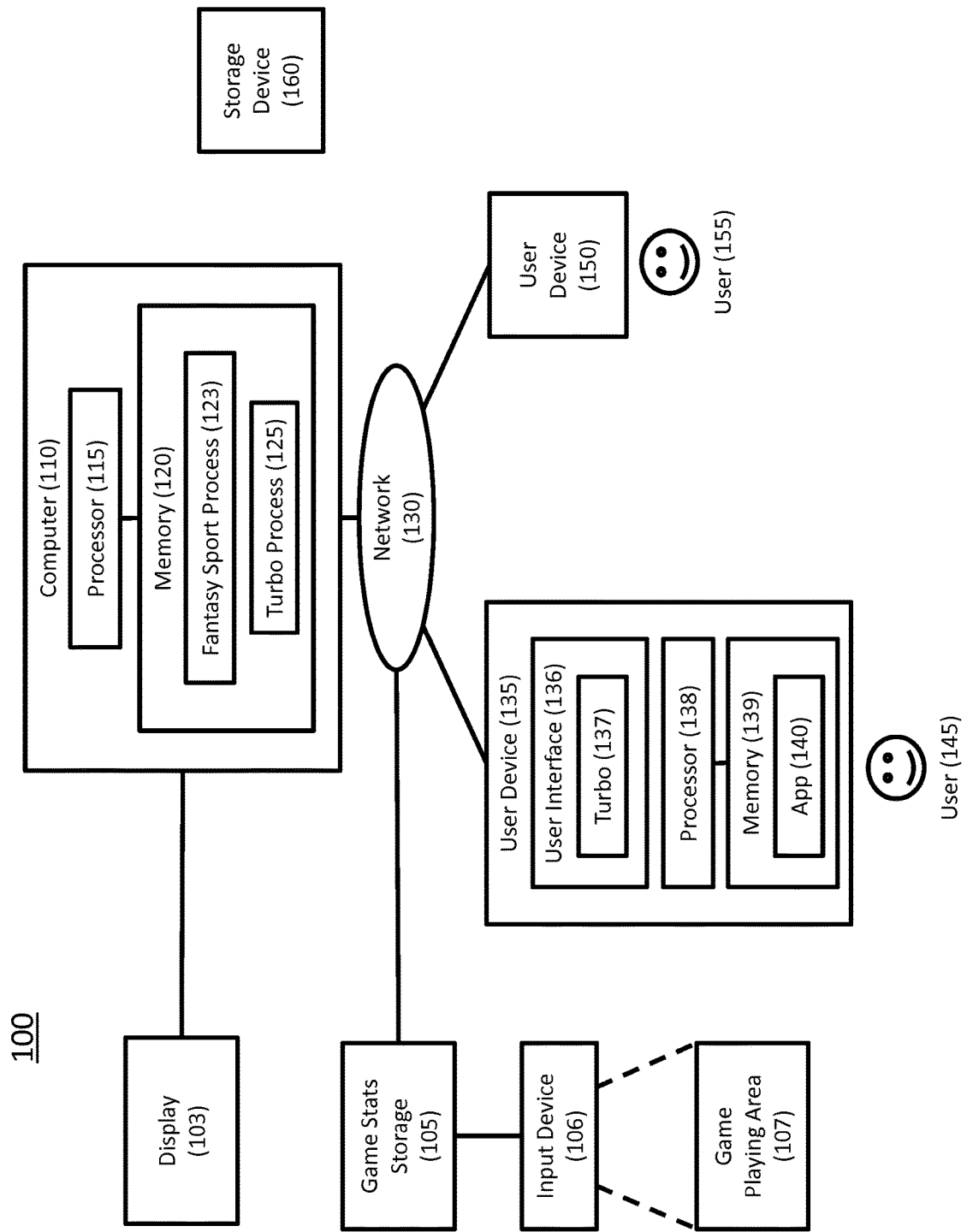
FIG. 1 is a block diagram of a system for encouraging a person to affirmatively engage in an activity.

FIG. 1 is a block diagram of a system 100 for encouraging a person to affirmatively engage in an activity. System 100 includes a computer 110, and user devices 135 and 150. System 100 is described herein in the context of a fantasy sport game, and in this context includes a game playing area 107, an input device 106, and a game statistics (stats) storage 105. Computer 110, user devices 135 and 150, and game stats storage 105 are communicatively coupled to a network 130.

Network 130 is a data communications network. Network 130 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, or (f) the Internet. Communications are conducted over network 130 by way of electronic signals and optical signals.

Game playing area 107 is an area in which a game is being played. The game can be a real game such as basketball being played by real people, or a virtual game being played by or on a computer.

Game stats storage 105 is a device, e.g., an electronic memory, for storage of statistics and records of events concerning the game.

Input device 106 is a device for inputting data into game stats storage 105. Input device 106 can be (a) a device such as a keyboard operated by a person (not shown) who manually enters data concerning an event, or (b) a camera or a detector, e.g., a detector in the hoop of a basket in a basketball game, that senses an event and automatically records data concerning the event.

System 100 is contemplated as servicing an arena in which the game is being played. Accordingly, computer 103 is coupled to a display 103 that is located in the arena. Display 103 may be directly connected to computer 110, as represented in FIG. 1, or communicatively coupled to computer 110 via network 130. Display 103 can be large-screen display, viewable by players and non-players, in a public area. In practice, system 100 may include a plurality of displays similar to display 103.

User device 135 is operated by a user 145, and user device 150 is operated by a user 155. Although system 100 is represented herein as having two user devices, i.e., user devices 135 and 150, for accommodating two users, i.e., users 145 and 155, system 100 may include many user devices and thus accommodate many users.

Computer 110 includes a processor 115, and a memory 120 coupled to processor 115. Although computer 110 is represented herein as a standalone device, it is not limited to such, but instead can be coupled to other devices (not shown) in a distributed processing system.

Processor 115 is an electronic device configured of logic circuitry that responds to and executes instructions.

Memory 120 is a tangible, non-transitory, computer-readable storage device encoded with a computer program. In this regard, memory 120 stores data and instructions, i.e., program code, that are readable and executable by processor 115 for controlling operations of processor 115. Memory 120 may be implemented in a random access memory (RAM), a hard drive, a read only memory (ROM), or a combination thereof. One of the components of memory 120 is a fantasy sport process 123. Another component of memory 120 is a turbo process 125.

Fantasy sport process 123 is a program that when executed controls processor 115 to read data from game stats storage 105, and based thereon, provide a fantasy sport experience for users 145 and 155.

Turbo process 125 is a program module that operates in association with fantasy sport process 123, and contains instructions for controlling processor 115 to execute turbo operations that are described herein. The term "module" is used herein to denote a functional operation that may be embodied either as a stand-alone component or as an integrated configuration of a plurality of subordinate components. Thus, turbo process 125 may be implemented as a single module or as a plurality of modules that operate in cooperation with one another. Moreover, although turbo process 125 is described herein as being installed in memory 120, and therefore being implemented in software, it could be implemented in any of hardware (e.g., electronic circuitry), firmware, software, or a combination thereof.

Either or both of fantasy sport process 123 and turbo process 125 may be implemented as a component of a website that is accessed via network 130, or implemented in a mobile application.

While fantasy sport process 123 and turbo process 125 are indicated as being already loaded into memory 120, either or both of them may be configured on a storage device 160 for subsequent loading into memory 120. Storage device 160 is a tangible, non-transitory, computer-readable storage device that stores program code thereon. Examples of storage device 160 include a compact disk, a magnetic tape, a read only memory, an optical storage medium, a hard drive or a memory unit consisting of multiple parallel hard drives, and a universal serial bus (USB) flash drive. Alternatively, storage device 160 can be a random access memory, or other type of electronic storage device, located on a remote storage system (not shown) and coupled to computer 110 via network 130.

Computer 110 outputs to display 103 and user devices 135 and 150, a result of an execution of fantasy sport process 123 and turbo process 125. Alternatively, or in addition, computer 110 could direct the output to a remote device (not shown) via network 130.

User device 135 includes a user interface 136, a processor 138 and a memory 139. Processor 138 is an electronic device configured of logic circuitry that responds to and executes instructions. Memory 139 is a tangible, non-transitory, computer-readable storage device that stores data and instructions that are readable and executable by processor 138 for controlling the operation of processor 138. One of the components of memory 139 is an application (app) 140.

User interface 136 includes an input device, such as a keyboard, speech recognition subsystem, or gesture recognition subsystem, for enabling user 145 to communicate information to and from processor 138, and via network 130, to and from computer 110. User interface 136 also includes an output device such as a display or a speech synthesizer. A cursor control or a touch-sensitive screen allows user 145 to utilize user interface 136 for communicating additional information and command selections to processor 138 and computer 110.

App 140 is an application program that implements an aspect of the turbo feature. In this regard, app 140 presents, by way of user interface 136, a feature designated as turbo 137, with which user 145 can interact to activate the turbo feature. Turbo 137 can be a displayed feature such as a button or an icon, or a gesture-recognition capability. App 140 may be a special-purpose software component for implementation of the turbo feature, or may be a general-purpose browser that allows user 145 to access a version of turbo process 125 implemented on a website.

User device 150 is configured similarly to user device 135.

In a practical implementation, fantasy sport process 123 would allow users 145 and 155 to define fantasy teams of players from a plurality of teams, and as such, system 100 would receive stats from a plurality of games. However, to simplify the description of the turbo function, system 100 is described herein in the context of a single game.

Although system 100 is described herein in the context of a fantasy basketball team where user 145 is rewarded points, system 100 could be utilized with any sport or competition, and more generally, with any activity where user 145 could track or anticipate an occurrence of an event, and the reward or benefit can be in a form other than points. For example, in a casino setting where system 100 is tracking an actual basketball game, user 145 could be rewarded with a monetary benefit.

Figure 2:
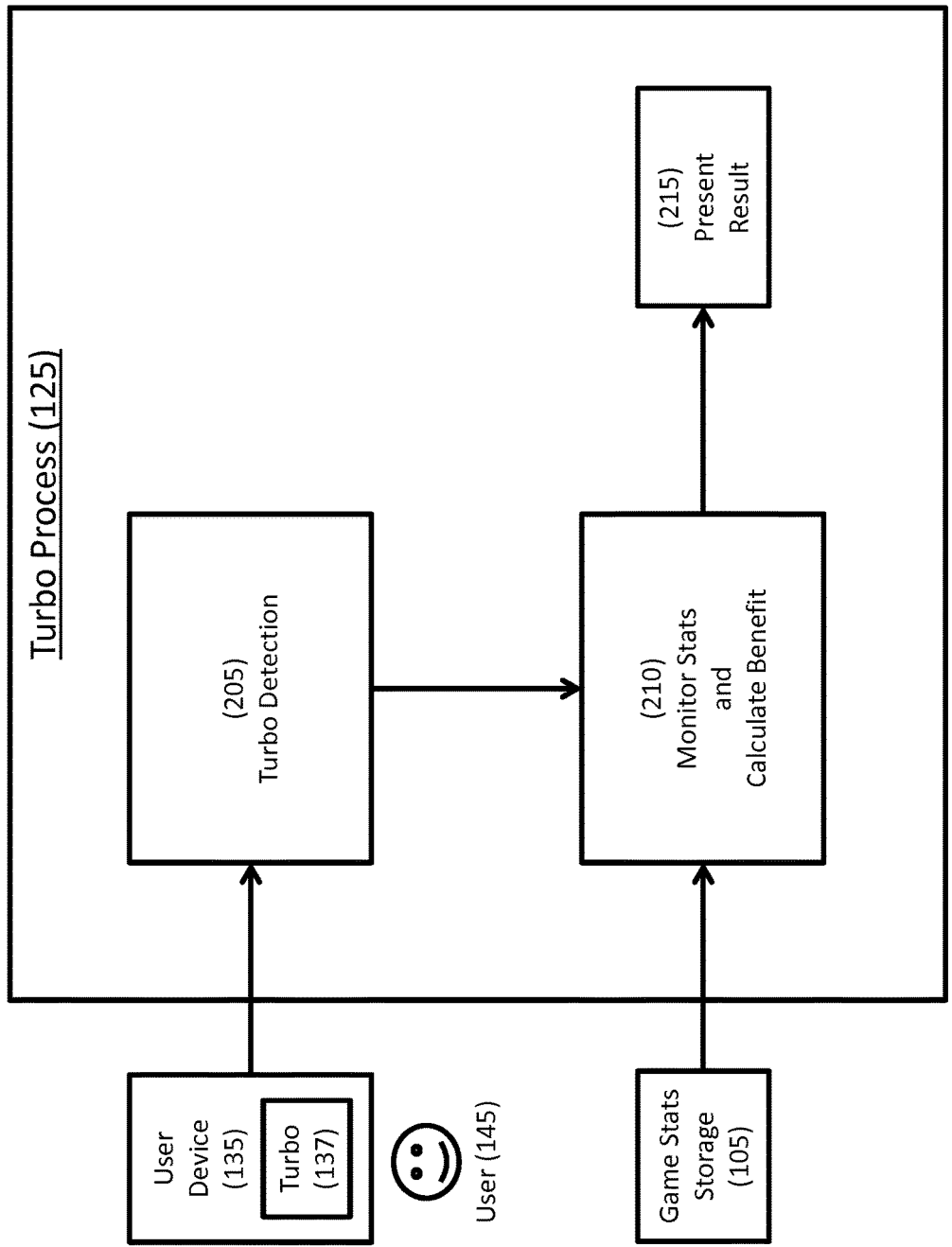
FIG. 2 is a block diagram of a turbo process, which is performed by the system of FIG. 1.

FIG. 2 is a block diagram of turbo process 125. Turbo process 125 includes three sub-processes, namely a sub-process 205, a sub-process 210 and a sub-process 215. Turbo process 125, and thus sub-processes 205, 210 and 215, are being performed by processor 115. As such, in the present document, although we describe operations being performed by turbo process 125 or its sub-processes, the operations are actually being performed by processor 115.

As mentioned above, system 100 may include many user devices and thus accommodate many users. However, for simplicity, the description of FIG. 2 covers a case of only user device 135 and user 145.

Sub-process 205 detects an activation of turbo 137, and upon receipt thereof, notifies sub-process 210.

Sub-process 210 monitors data from game stats storage 105. When sub-process 210 receives data indicative of an occurrence of an event, sub-process 210 allots a benefit, e.g., a point. If the event occurred within a particular window of time, i.e., a turbo period or turbo window, with respect to the activation of turbo 137, sub-process 210 modifies the benefit to yield a modified benefit or enhanced benefit, e.g., more points.

Sub-process 210 produces a result. If the event did not occur during a turbo window, the result is simply the un-modified benefit. If the event occurred during a turbo window, the result is the modified benefit.

Sub-process 215 presents the result in an output to display 103 and user device 135.

Figure 3:
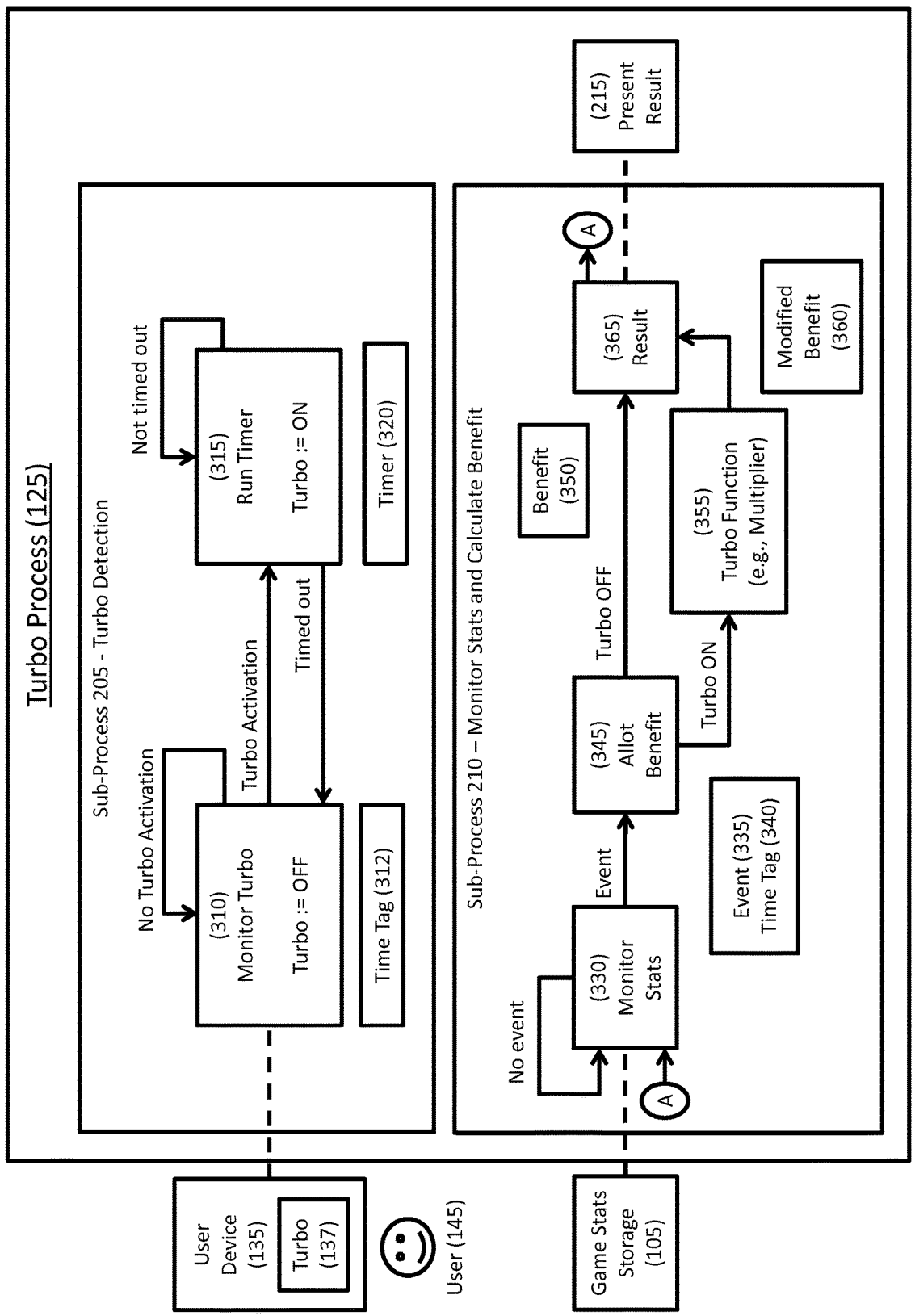
FIG. 3 is a state diagram of an implementation of the turbo process.

FIG. 3 is a state diagram of an implementation of turbo process 125. Similarly to the description of FIG. 2, for simplicity, the description of FIG. 3 covers a case of only user device 135 and user 145.

Sub-process 205, as indicated above, is for turbo detection. Sub-process 205 (a) controls a variable called Turbo, which can be either OFF or ON, and (b) utilizes a timer 320. Sub-process 205 begins in state 310.

In state 310, sub-process 205 is waiting for a turbo activation signal from user device 135. Turbo is OFF, and while there is no turbo activation signal, sub-process 205 remains in state 310. Upon receipt of the turbo activation signal, the time of the turbo activation is recorded as time tag 312, and sub-process 205 progresses to state 315.

In state 315, Turbo is set ON, and timer 320 runs, i.e., is enabled to count. Timer 320 is configured to count for some finite period of time, and thus counts until it times out. While timer 320 has not timed out, sub-process 205 remains in state 315, and Turbo remains ON. When timer 320 times out, sub-process 205 returns to state 310.

Sub-process 210, as indicated above, is for monitoring stats and calculating a benefit. Sub-process 210 begins in state 330.

In state 330, sub-process 210 monitors game stats storage 105, and waits for notification of an event, e.g., Player X making a basket. While there is no event, sub-process 210 remains in state 330. Upon receiving data indicative of an occurrence of an event, sub-process 210 progresses to state 345.

Sub-process 210 generates a record that includes fields for (a) an event 335, which identifies the event, and (b) a time tag 340 that indicates the time of the occurrence of the event.

In state 345, sub-process 210 allots a benefit 350, e.g., a point, and reads the variable Turbo, which is controlled by sub-process 205. If Turbo is OFF, sub-process 210 advances to state 365. If Turbo is ON, sub-process 210 progresses to state 355.

In state 355, sub-process 210 applies a turbo function to benefit 350, and thus modifies benefit 350 to yield a modified benefit 360. For example, the turbo function may multiply the value of benefit 350. From state 355, sub-process 210 progresses to state 365.

In state 365, sub-process 210 prepares a result. If sub-process 210 entered state 365 from state 345, the result is simply benefit 350. If sub-process 210 entered state 365 from state 355, the result is modified benefit 360. From state 365, sub-process 210 returns to state 330.

Sub-process 215 obtains the result from sub-process 210, and presents the result in an output to display 103 and user device 135.

FIGS. 4-9 are graphs that illustrate various examples of an effect of the turbo. Each of FIGS. 4-9 has a horizontal axis that designates time, and a vertical axis that designates a value of a multiplier.

Figure 4:
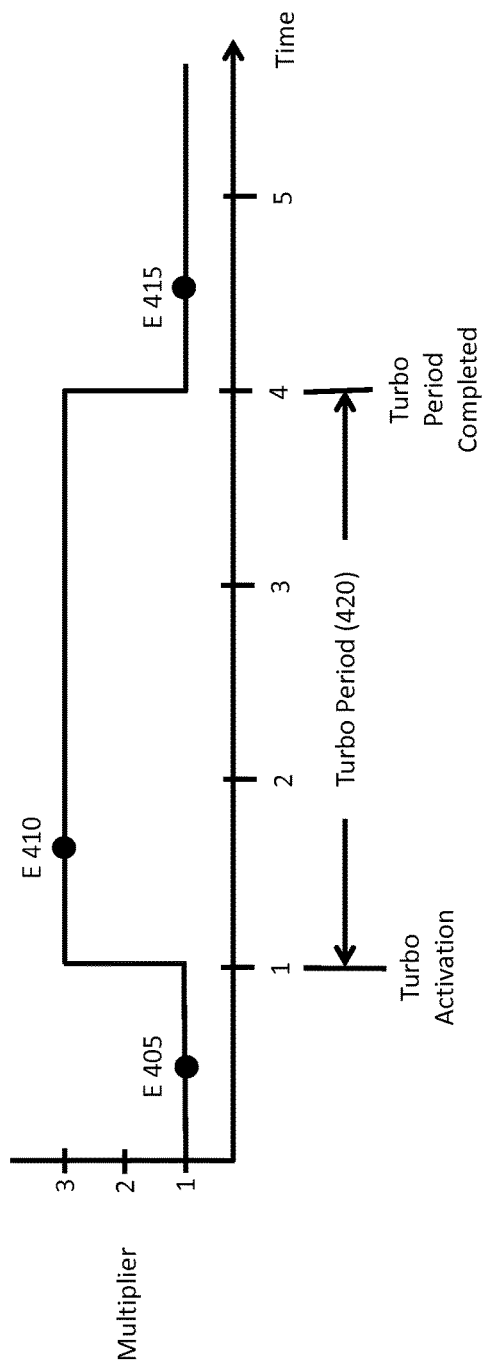
FIG. 4 is a graph of a basic turbo operation.

FIG. 4 is a graph of a basic turbo operation, designated as Example 400. In Example 400, prior to time 1, the turbo is not active, and so the multiplier has an effective value of 1. At time 1, the turbo is activated. From time 1 through time 4, the turbo remains active as indicated by a turbo period 420, and the multiplier has a value of 3. At time 4, turbo period 420 is completed, and the multiplier resumes its effective value of 1.

Example 400 illustrates occurrences of three events, namely events E 405, E 410 and E 415. Event E 405 occurred prior to time 1, i.e., while the turbo was not active. As such, a benefit associated with event E 405 is not modified by the turbo function. Event 410 occurred during turbo period 420, and so, a benefit associated with event E 410 is multiplied by 3. Event E 415 occurred after the completion of turbo period 420, and so, a benefit associated with event E 415 is not modified by the turbo function.

Figure 5:
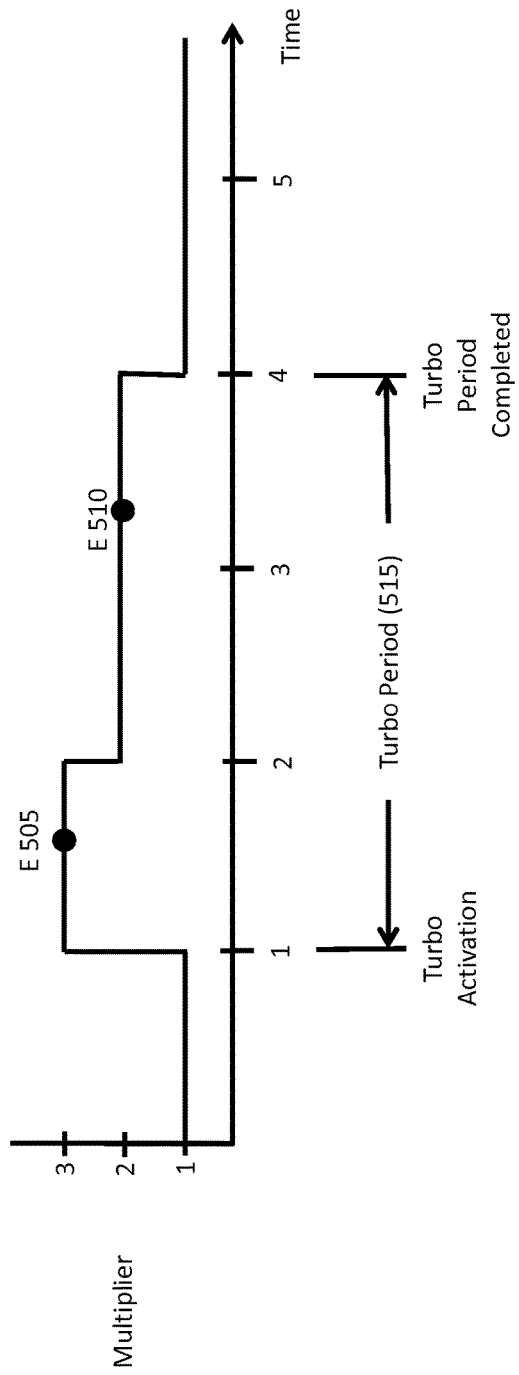
FIG. 5 is a graph of a turbo operation where a multiplier varies with time.

FIG. 5 is a graph of a turbo operation, designated as Example 500, where a multiplier varies with time. In Example 500, prior to time 1, the turbo is not active, and so the multiplier has an effective value of 1. At time 1, the turbo is activated. From time 1 through time 4, the turbo remains active as indicated by a turbo period 515. From time 1 through time 2, the multiplier has a value of 3. From time 2 through time 4, the multiplier has a value of 2. At time 4 turbo period 515 is completed, and the multiplier resumes its effective value of 1.

Example 500 illustrates occurrences of two events, namely events E 505 and E 510. Event E 505 occurred between time 1 and time 2, and so, a benefit associated with event E 505 is multiplied by 3. Event E 510 occurred between time 2 and time 4, and so, a benefit associated with E 505 event E 510 is multiplied by 2.

In Example 500, the turbo operation is represented by a step function. The step function is an example of an arithmetic function that varies with time. That is, its value, i.e., magnitude, is a function of time. If desired, instead of a step function, the turbo operation can be represented by a curve that has a slope that varies with time.

Figure 6:
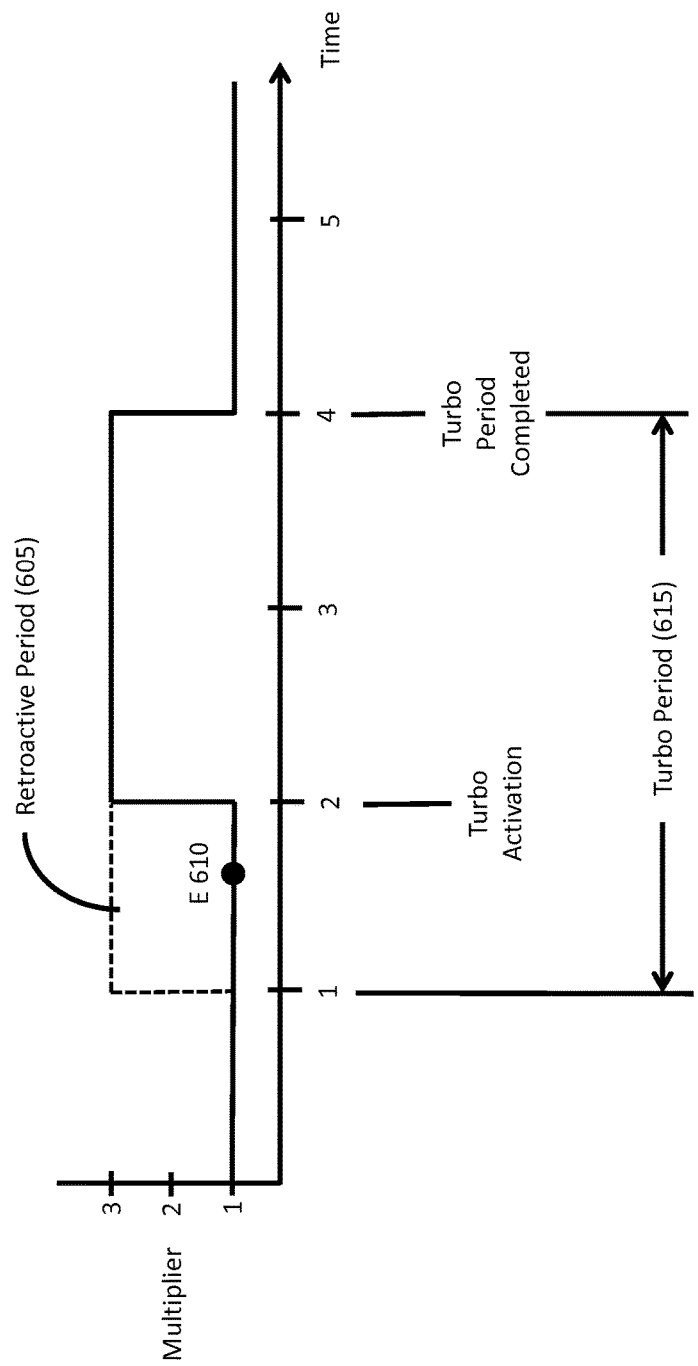
FIG. 6 is graph of a turbo operation in which a turbo period is extended to include a period of time prior to activation of the turbo.

FIG. 6 is graph of a turbo operation, designated as Example 600, in which a turbo period is extended to include a period of time prior to activation of the turbo. More specifically, in Example 600, the turbo is not activated until time 2, but a turbo period 615 is extended in a negative direction, to time 1, to include a period of time prior to the activation of the turbo, as indicated by a retroactive period 605. Turbo period 615 thus spans from time 1 to time 4, and a multiplier of 3 will be applied to events that occur between time 1 and time 4.

Example 600 illustrates an occurrence of an event E 610 in retroactive period 605. Accordingly, a benefit associated with event E 610 is multiplied by 3.

Figure 7:
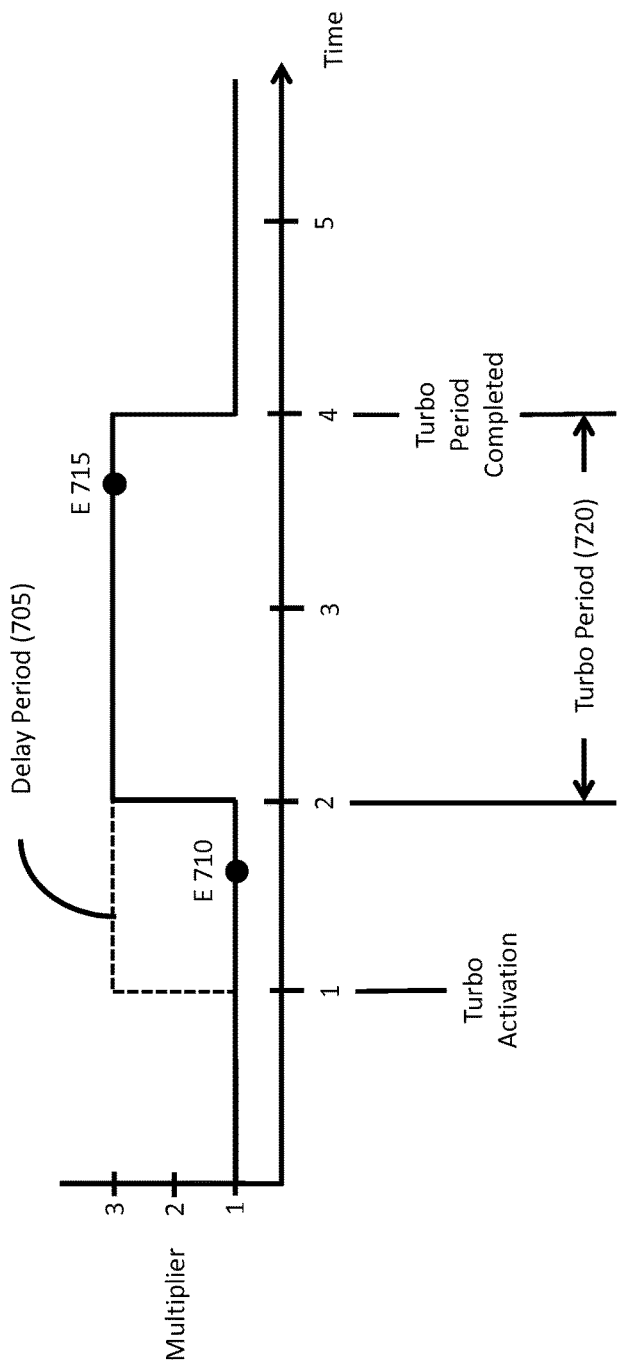
FIG. 7 is a graph of a turbo operation in which a turbo period is delayed from a time of an activation of the turbo.

FIG. 7 is a graph of a turbo operation, designated as Example 700, in which a turbo period is delayed from a time of an activation of the turbo. In Example 700, the turbo is activated at time 1, but there is a delay period 705, and a turbo period 720 does not begin until time 2.

Example 700 illustrates occurrences of two events, namely events E 710 and E 715. Event E 710 occurred during delay period 705, and thus, prior to the beginning of turbo period 720. As such, a benefit associated with event E 710 is not modified by the turbo function. Event E 715 occurred during turbo period 720, and so, a benefit associated with event E 715 is multiplied by 3.

Figure 8:
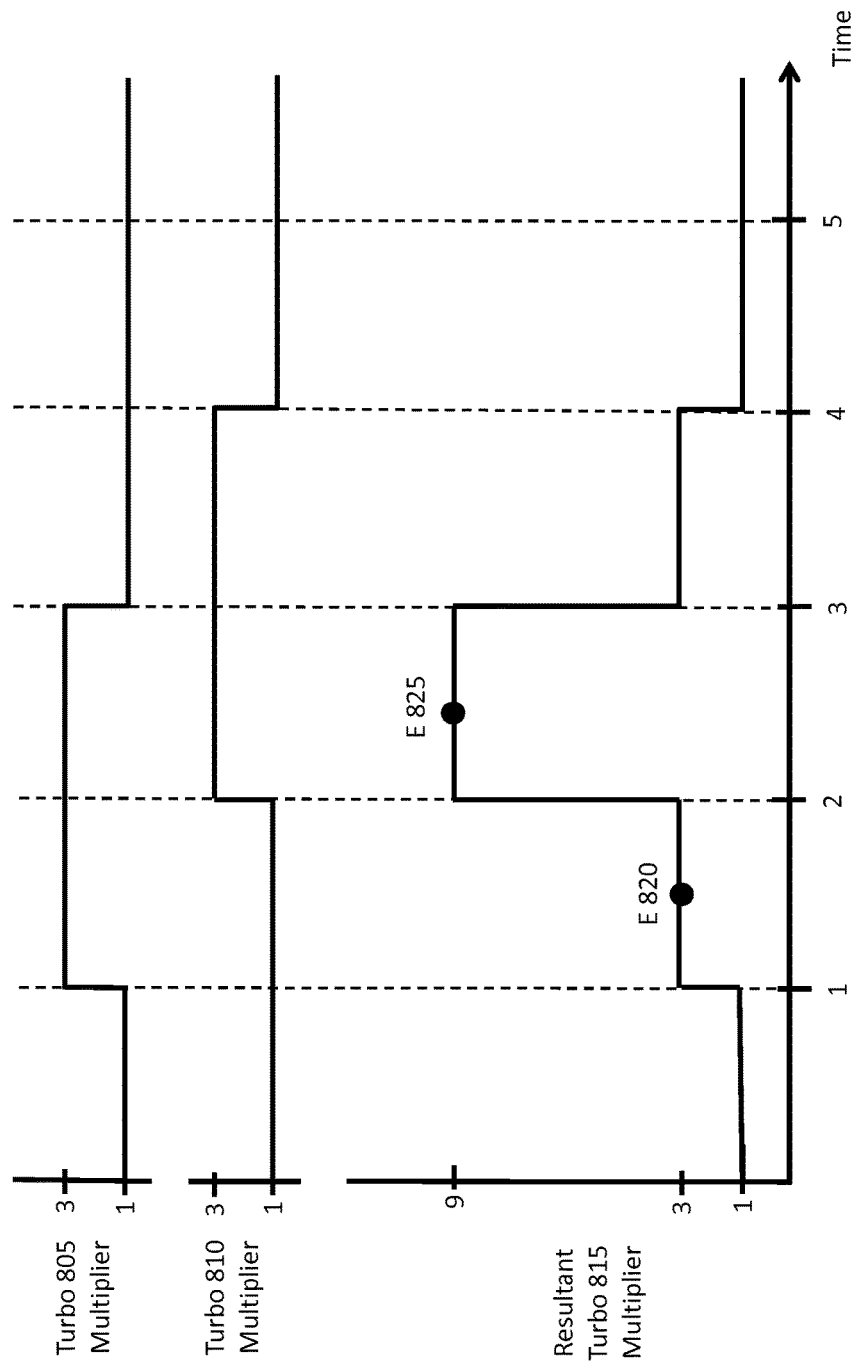
FIG. 8 is a graph of a turbo operation for a case where a user has activated two turbos so that for some period of time, the two turbos are concurrently active.

FIG. 8 is a graph that illustrates another example of an effect of the turbo, designated as Example 800, and more specifically, for a case where user 145 has activated two turbos so that for some period of time, the two turbos are concurrently active. User 145 activated a turbo 805 at time t1. Turbo 805 runs from time 1 to time 3, and provides a multiplier of 3. User 145 activated a turbo 810 at time t2. Turbo 810 runs from time 2 to time 4, and provides a multiplier of 3. Thus, both of turbos 805 and 810 are concurrently active from time 2 to time 3.

A resultant turbo 815 that represents a net effect of turbos 805 and 810 has a turbo period that runs from time 1 to time 4. From time 1 to time 2, turbo 805 is running, and resultant turbo 815 provides a multiplier of 3. Accordingly, a value for an event E 820 that occurs between time 1 and time 2 is multiplied by 3. From time 2 to time 3, turbos 805 and 810 are concurrently active, and the multiplier of turbo 805 is multiplied by the multiplier of turbo 810 so that resultant turbo 815 provides a multiplier of 9, i.e., 3×3. Accordingly, a value for an event E 825 that occurs between time 2 and time 3 is multiplied by 9. System 100 recognized that event E 825 occurred within a window of time, e.g., between time 2 and time 3, with respect to both of the time of occurrence or activation of turbo 805 and the time of occurrence or activation of turbo 810, and so, the benefit allotted as a result of the occurrence of event E 825 is processed in accordance with the combined effect of turbos 805 and 810.

Thus, system 100 is configurable so that user 145, i.e., an individual user, can activate multiple turbos. As shown in Example 800, user 145 activated a first turbo, i.e., turbo 805, and soon thereafter, activated a second turbo, i.e., turbo 810. For event E 825, turbo 805 multiplied a value by 3, and turbo 810 multiplied the already multiplied value by another 3, for a result of 9 times the original value. Alternatively, the concurrent activation of turbos 805 and 810 may be additive such that turbo 805 multiplies the original value by 3, and turbo 810 also multiplies the original value by 3, and the result is an addition of the result from the two turbos, for a net result of 6, i.e., 3+3=6. Generally, turbos 805 and 810, and the combined effect of turbos 805 and 810, can exercise any desired arithmetic operation on the values for events E 820 and E 825.

For the case of concurrent turbos, the turbos can be activated by different users. For example, user 145 can activate turbo 805, and user 155 can activate turbo 810. A resultant benefit can be accorded to either or both of user 145 and user 155. For example, where user 145 and user 155 are in competition with one another, the user who activates his turbo first will reap the benefit of the concurrent turbos. The benefit could also be awarded to the user who activates his turbo closest to the time of an event, or activates his turbo second. If user 145 and user 155 are playing together as teammates on a team, the benefit of the concurrent turbos could be awarded to the team.

Figure 9:
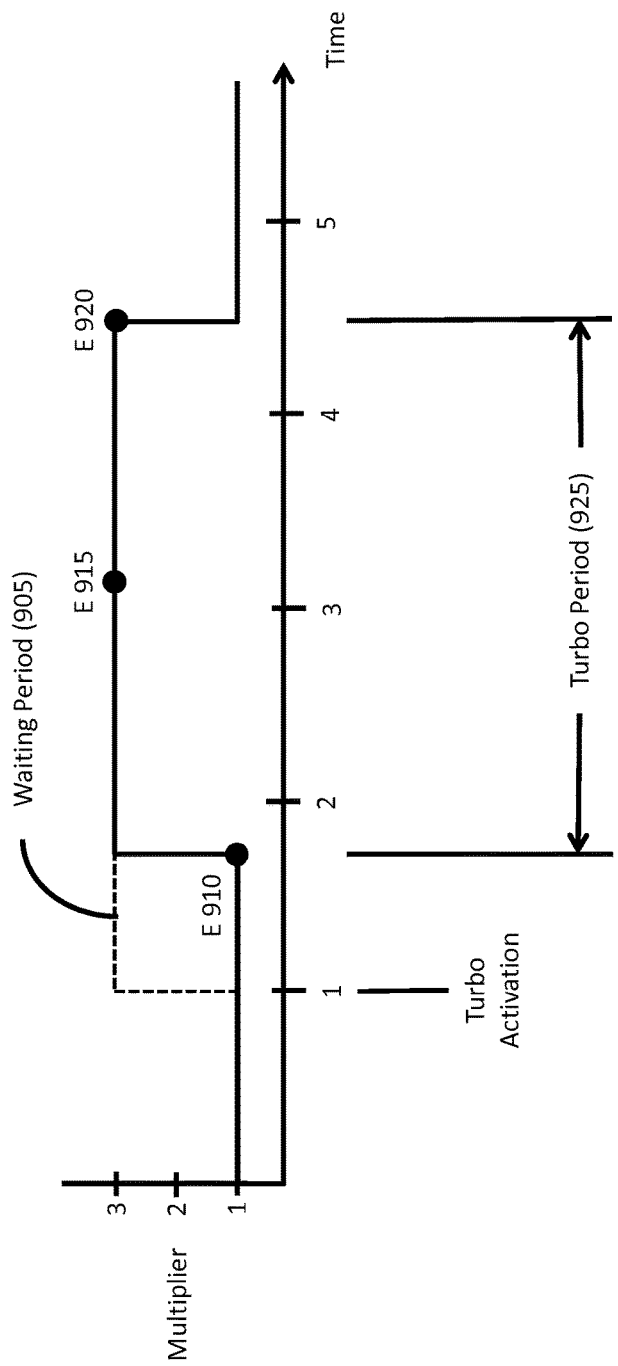
FIG. 9 is a graph of a turbo operation where a user activates a turbo, but the beginning of a turbo period and the end of the turbo period are defined by events.

FIG. 9 is a graph of another feature of turbo process 125, designated as Example 900, where user 145 activates the turbo, but the beginning of the turbo period and the end of the turbo period are defined by events. Here, user 145 activates turbo 137 at time 1, but a turbo period 925 does not begin until an occurrence of a window-activating event, e.g., an event E 910. Thus, there is a waiting period 905 between the activation of turbo 137 and the beginning of turbo period 925. Turbo period 925 runs from the occurrence of event E 910 until the occurrence of a window-ending event, e.g., an event E 920. An event 915 that occurs during turbo period 925 is modified by the turbo function. Waiting period 905 may be of a finite duration, so that if event E 910 does not occur within some particular period of time from the turbo activation, turbo period 925 will not occur.

In accordance with example 900, user 145 may activate turbo 137 to queue or prime system 100 to activate a turbo upon a subsequent event, e.g., event E 910, in a game or competition. For example, user 145 may be playing a fantasy football game, press turbo 137, thus causing system 100 to actuate turbo period 925 when a subsequent down, e.g., event E 910, in a professional football game begins.

In accordance with example 900, an event, e.g., event E 920, in a game or competition may end turbo period 925. For example, in a fantasy football game, turbo period 925 may be active for a certain number of downs, or that turbo period 925 ends when a second subsequent down occurs. As an alternative example, in a fantasy basketball game, turbo period 925 ends, e.g., event E 920 occurs, when the quarter in a professional basketball game ends.

As mentioned above, turbo process 125 may be implemented in any of hardware, firmware, software, or a combination thereof. The implementation shown in FIG. 3 is a basic embodiment. In other embodiments, the turbo operations in FIGS. 4-9 can be achieved by storing and delaying or manipulating values of, time tag 312, timer 320 or time tag 340, or storing and delaying processing of event 335. In other words, the turbo activations and events may be collected and subsequently processed. In an object-oriented processing environment, multiple instances of turbo process 125 or its components may be instantiated.

Aspects of the turbo operation may be influenced by actions of user 145. For example, system 100 may be configured so that (a) the turbo activation signal is produced as a result of a sequence of actions performed on user interface 136, e.g., three taps of turbo 137, or (b) the turbo period has a duration that is based on a characteristic of an action performed on user interface 136, e.g., an interval of time between taps of turbo 137.

To discourage over-use or unwarranted use of the turbo, system 100 may limit the number of times that user 145 can activate the turbo during a particular interval of time. For example, system 100 may limit user 145 to five activations per minute.

The quantity of turbo activations a player may use during a fantasy game may be limited. Also or instead, a cumulative duration of turbo periods may be limited. For example, user 145 may activate a turbo by pressing turbo 137, and later end the turbo by pressing turbo 137. User 145 could repeat the process of pressing turbo 137 to activate and end turbo periods until user 145 has used a cumulative total of 60 seconds of turbo periods.

As an alternative example, user 145 may activate a turbo by pressing and holding down turbo 137 and later end the turbo by releasing turbo 137. User 145 could repeat the process of activating and ending turbo periods until user 145 has used a cumulative total of 60 seconds of turbo periods.

User 145's interactions with turbo 137 could be processed by either app 140 or turbo process 125. Additionally, although turbo process 125 is described herein as being performed by processor 115, turbo process 125 could reside in memory 139 and be performed by processor 138.

For a case where user 145 activated turbo 137, the benefit or the modified benefit could be accorded to user 145. However, the benefit or the modified benefit could, alternatively or in addition, be accorded to user 155. Such an arrangement would be appropriate, for example, where user 145 and user 155 are playing together, as teammates. Such an arrangement might motivate user 155 to encourage user 145 to pay attention to a game. In a case where user 145 and 155 are competitors of one another, the benefit to user 145 can take the form of reducing a benefit to, or in some other way penalizing, user 155.

An event can be a single event, yet have various associated point values. For example, in basketball, a basket can be worth from 1 to 3 points based on the distance from which the basketball player makes a shot. Accordingly, for a basket, user 145 could be granted a basic benefit of 1 to 3 points, and if the turbo is active, some multiple thereof. Similarly, in baseball, a pitch may qualify as an event, where a point value for the event is based on how close the ball is to the strike zone.

An event can be a compilation or sequence of several individual events. For example, an event may be defined as a basketball player taking three shots, regardless of whether any of the shots resulted in a basket.

The techniques described herein are exemplary, and should not be construed as implying any particular limitation on the present disclosure. It should be understood that various alternatives, combinations and modifications could be devised by those skilled in the art. For example, the various turbo operations presented in FIGS. 4-9 can be implemented in combinations or permutations with one another. For example, (a) an employment of retroactive period 605 can be combined with concurrent turbos 805 and 810, or (b) a first activation of a turbo can employ retroactive period 605, and a second activation of the turbo can employ delay period 705. Also, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. One or more non-transitory computer-readable media storing computer-executable instructions that, when executed by a processor, perform a method of engaging a user in a fantasy game experience in real time, wherein the fantasy game experience is associated with a live game, and wherein the live game has one or more players, and the user is not one of the one or more players of the live game, the method comprising:

monitoring the live game for an occurrence of at least one event, wherein the occurrence of the at least one event results in an unmodified benefit to the user in the fantasy game experience when the at least one event occurs during a first duration of the live game, wherein the occurrence of the at least one event results in a modified benefit to the user in the fantasy game experience when the at least one event occurs during a second duration of the live game;

receiving, during the live game, information indicative of the user actuating an input associated with a user interface for at least partial engagement by the user in the fantasy game experience in real time;

tracking, in response to receiving information indicative of the user actuating the input, the second duration of the live game, wherein a beginning of the second duration of the live game is substantially temporally proximal to the receiving information indicative of the user actuating an input;

receiving information indicative of the occurrence of the at least one event in the live game and during the second duration; and crediting, in response to receiving information indication of the occurrence of the at least one during the second duration, a user account with the modified benefit.

2. The media of claim 1, wherein the first duration is a first predefined period of time, and wherein the second duration is a second predefined period of time.

3. The media of claim 1, wherein the first duration is initiated or terminated based on an occurrence of a first sub-event, wherein the second duration is initiated or terminated based on an occurrence of a second sub-event, and wherein neither of the first sub-event nor the second sub-event is associated with a time period of play of the live game.

4. The media of claim 1, wherein the event is a pre-designated player in the live game performing a pre-designated sub-event.

5. The media of claim 1, wherein the user is a first user and the user interface is a first user interface, wherein the method also facilitates engaging a second user in a fantasy game experience in real time, wherein the method further includes the step of receiving, during the live game, information indicative of the second user actuating an input associated with a second user interface for at least partial engagement by the second user in the fantasy game experience in real time.

6. The media of claim 5, wherein the method further includes the step of:

determining which of the first user and the second user actuated their respective user input associated with the respective user interface first, such that the modified benefit is credited to the user account of first-actuating user.

7. The media of claim 5, wherein the method further includes the step of:

determining a time during play of the live game when each of the first user and the second user actuated their respective user input, and crediting the user account of the user actuating their respective user input closest in time to the at least one event.

8. The media of claim 1, wherein the method further includes the step of:
   determining, during a time of play of the live game, a number of times the user actuated the input; and
   based on the number of times the user actuated the input, modifying the user account.

* * * * *